Patented Nov. 12, 1929

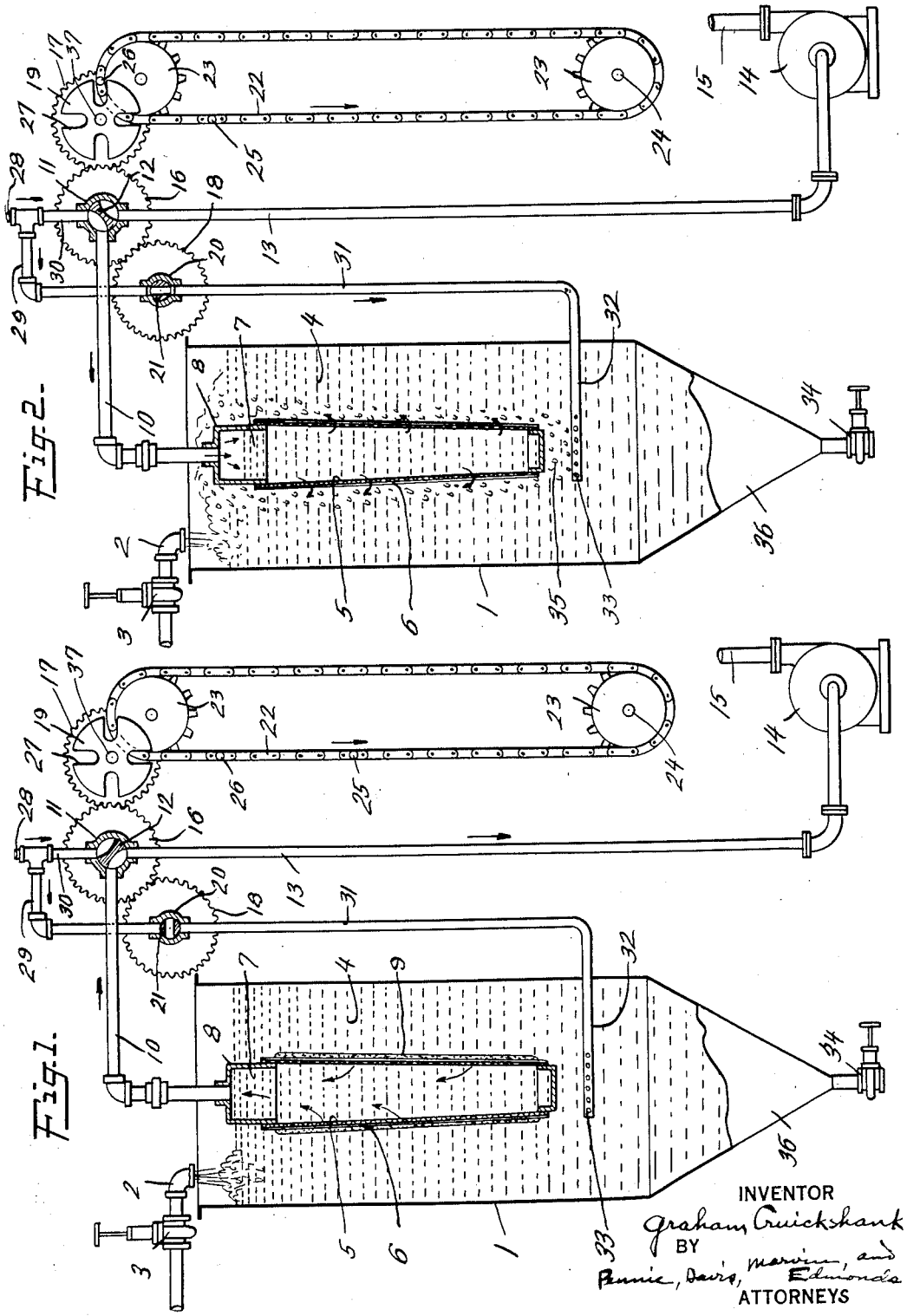

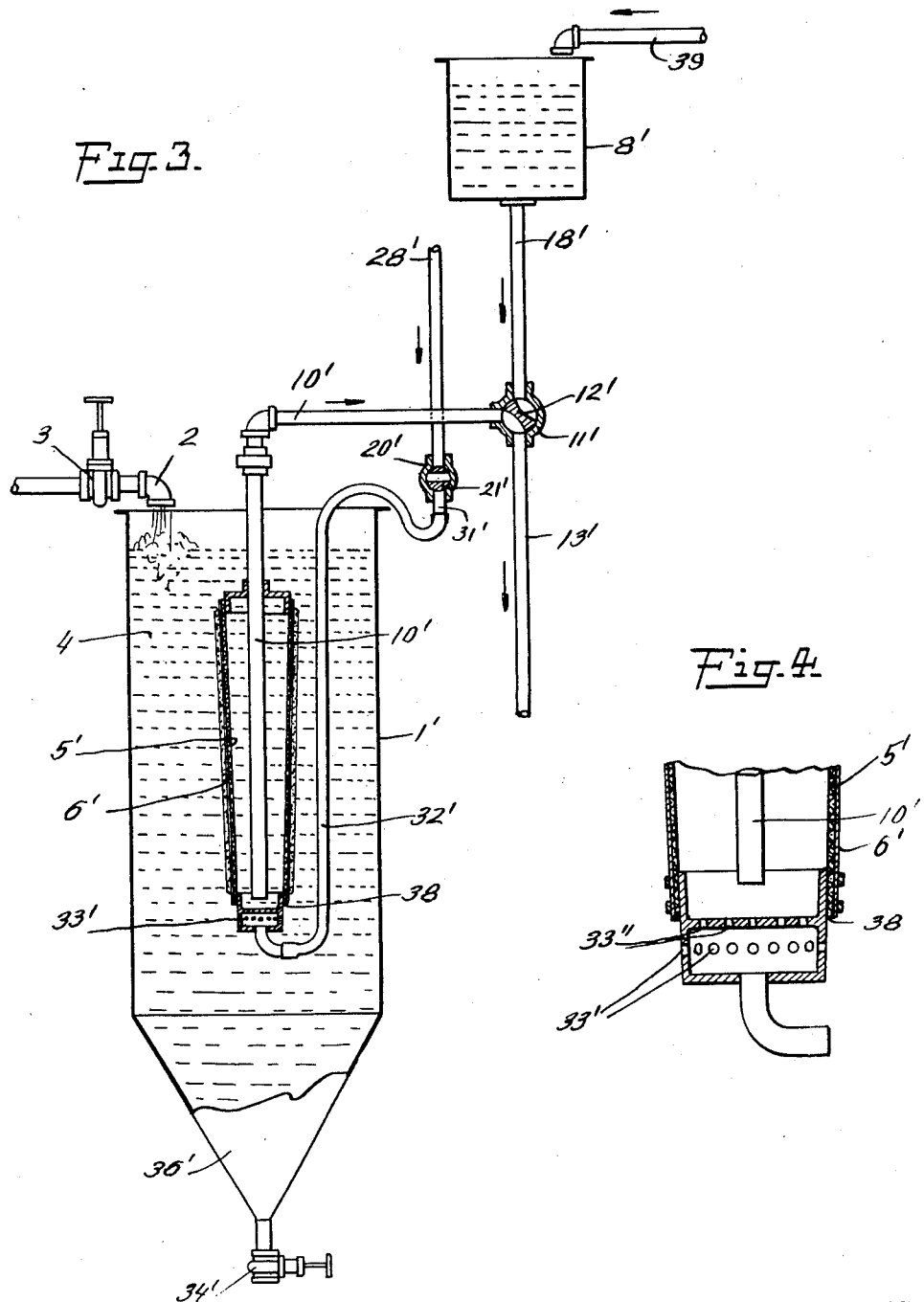

1,734,999

UNITED STATES PATENT OFFICE

GRAHAM CRUICKSHANK, OF TRAIL, BRITISH COLUMBIA, CANADA, ASSIGNOR, BY MESNE ASSIGNMENTS, TO GENTER THICKENER COMPANY, A CORPORATION OF DELAWARE

METHOD OF FILTERING AND THICKENING MIXTURES

Application filed October 10, 1925. Serial No. 61,676.

This invention relates to that method of filtering and thickening mixtures of liquids and solids wherein the liquid product of the operation is removed as filtrate by means of a filtering medium, preferably in the form of a plurality of hollow filtering elements submerged in the mixture, and cleansed periodically in situ, either continuously, automatically or otherwise, of the solids that accumulate on the surfaces of these elements, these solids being thrown off into the mixture to thicken the same. The object of the invention is the provision of an improved method of filtering and thickening mixtures, particularly in regard to the cleansing of the filtering medium.

Certain mixtures met with in many branches of the industrial arts, such, for example, as in the treatment of certain metallurgical products, contain suspensions of more or less colloidal, gelatinous, or gummy materials, or finely divided solids. The filter-thickening of these mixtures presents a nice problem because when these solids are intercepted by the filtering medium they form a film or cake that tends to adhere to the medium and is difficult to separate therefrom. Furthermore, an extremely thin film of solids of this kind is sufficient to so clog up the pores of the filtering medium as to greatly interfere with the passage of filtrate. Hence frequent cleaning of the filtering medium is necessary, and this is apt to reduce the filtration rate and increase the cost of filtration.

It has been customary in the past in operating filter-thickening apparatus to periodically interrupt the filtering action and produce a reverse flow, or counter current, of liquid and/or gas through the pores of the filtering medium for the purpose of discharging the accumulated solids into the mixture. This method involving the back flow or kick-back of liquid, such as a portion of the filtrate, through the filtering medium has been eminently successful, but a counter current, i. e. a cleansing current, of air or gas alone has never come into general use in filtering any kind of material.

Thus attempts have been made to dislodge such films of solids as above particularly mentioned, from the exterior of pendant flat or tubular elements, by merely blowing compressed air back through the elements. However, this method has not been very effective. The air passes through the filter medium so easily that it escapes through the upper portion of the element surface and in removing the film efficiently at that portion fails to cleanse the medium on the remainder of the surface. If air could be bubbled through every pore of the entire surface of the medium while it is in submergence the film would be removed very efficiently. However this is practically impossible or at least not economical in commercial installations. Furthermore the liquid or filtrate counter current described above so floods the ordinary films of solids from the medium that it is more effective and quicker than attempting to bubble compressed air through the pores of the entire medium. Furthermore, the employment of filtrate for cake removal keeps the elements filled with liquid so that filtration takes place the instant vacuum is again applied. If air is introduced into the interior of the elements this has to be evacuated before filtration again begins to take place.

The present invention involves the producing of an action on the exterior of the filtering medium within the mixture undergoing treatment, which is in addition to the production of a reverse flow, through some portion at least of the filtering medium, of liquid or gas, and resulting in the prompt discharge or removal of the colloidal, gummy, or adhesive solids into the mixture.

Thus, according to the invention, the mixture is subjected, while in contact with a filtering medium, to a filtering action in the course of which solids accumulate on the surface of the medium. The filtering action is periodically interrupted and a cleansing current sent through the pores of the filtering medium, and simultaneously with this cleansing current, a current of the mixture is produced in proximity to the filtering medium. This mixture current can be produced in any desired manner but it is preferably produced by an air-lift action. If air or gas bubbles are allowed to rise through the unfiltered mixture in proximity to the filtering medium during the counter current action, an air-lift current is not only created on the surface of the film of solids adhering to the medium which greatly aids in removing these solids, but the current action of the air or gas bubbles on the exterior surface of the film is also materially aided by the lighter specific gravity of the resulting mixture of air or gas bubbles and consequent reduction in the hydrostatic pressure of the unfiltered mixture surrounding the element surface. Furthermore there is an added agitating and scrubbing action due to the various currents created by the rapidly rising bubbles in their zig zag ascent to the surface of the unfiltered mixture.

The additional action referred to above, under certain conditions, is itself instrumental in producing the reverse or counter current cleansing flow, hence, under these conditions, some of the direct steps of the complete process of the invention may be omitted and still a practicable cleansing of the filter medium will be effected. In further explanation of this, the mere interruption of the filtering action and reduction of the hydrostatic pressure of the mixture in the immediate region of the filtering medium, or the reduction of the specific gravity of the mixture in this region, such, for example, as occurs when air is introduced into the mixture near the lower portion of the filtering medium, produce both an outward flow through the filtering medium and a current of the mixture, which remove the solids.

What I consider to be the most desirable plan at present, however, is to employ the principles of this invention to aid the counter current commonly used, but the additional mixture current action may not be of the same duration as the application of counter current through the medium. The counter current may be caused to initiate the cake removal, and the additional current action continues the removal until the medium is sufficiently cleansed. In this way the counter current is applied for an instant only, and a large saving in filtrate is thus effected.

Although the present invention affords a practicable method of removing colloidal or gummy and adhering filter cakes or films which, hitherto have given much difficulty, it can be employed to advantage in the filter-thickening of many other materials. On all materials it produces a more complete cleansing of the filtering medium, and reduces the amount of filtrate or liquid flooded back through the medium for each cake removal.

The invention will be better understood by referring to the accompanying drawings showing diagrammatically and merely for purpose of illustration an apparatus by which the method of the invention may be carried out. In these drawings:

Fig. 1 is a diagrammatic view of the apparatus as it appears during the filtration period;

Fig. 2 shows the additional cleansing current taking place simultaneously with the counter current impulse;

Fig. 3 shows a modification wherein the application of the additional cleansing current can precede or follow or overlap the application of the counter current through the medium;

Fig. 4 is an enlarged section through a modification of the air distributing means.

Referring to the accompanying drawings, one or several filter elements having foraminous walls 5 and covered with suitable medium 6 are submerged or immersed within the mixture to be thickened 4 which is contained in any suitable tank 1. The mixture of liquids and solids to be thickened is supplied to the tank 1 through a supply pipe 2 and control valve 3, the flow of the unfiltered mixture being regulated in accordance with the operation of the remainder of the apparatus.

In Fig. 1 the filter element 5 ends at its upper portion in a chamber 8 which serves to store some filtrate 7, which serves as a surplus for cake removal purposes as outlined in Patent No. 1,359,162, granted on November 16th, 1920 to Albert L. Genter. The chamber 8 is connected by means of pipes 10 and union to automatic valve 11 with its shifting plug 12, which connects the filtrate line 10 on one side with pipe 13 and evacuating pump 14, and on the other side with air or gas pipe 30 which in turn is connected with line 28 leading from a compressed air or gas source supplying air at a relatively low pressure. This line 28 also branches off to pipe 29 which in turn is connected with automatic valve 20 and its shifting plug 21, which connects and disconnects the compressed air source with line 31 that leads to the lower portion of the mixture tank 1 to line 32, ending substantially under the filter element, and having small appropriate perforations 33 therein.

For convenience of explaining the action of this diagrammatic apparatus a mechanical means of shifting these valves and causing an automatic action is shown. The stems of plugs 12 and 21 of valves 11 and 20 are fastened to appropriate intermeshing gears, 16 and 18. Gear 16 in turn meshes with gear 17 located on shaft 37. To this same shaft is secured the stop-wheel 19 constructed on the principle of the Geneva stop with its notches 27. At its side, located in the proper position is sprocket 23 which carries a link belt chain 22, which in turn runs over the lower mechanically driven sprocket 23 mounted on shaft 24.

Appropriately spaced on this link chain 22 there are two pin-rollers 25 and 26 extending beyond the sides of the chain 22 which is driven continuously as indicated by the arrows. During the course of the travel of chain 22 these projecting rollers 25 and 26 engage the notches of stop-wheel 19 and cause it to shift with the consequence that plugs 12 and 21 of valves 11 and 20 are also shifted.

In Fig. 1 the apparatus is shown during filtration. Pump 14 of any convenient construction is pulling filtrate from element 5 through line 10, valve 11 and line 13 and delivering the filtrate through the discharge line 15 to any convenient place. Plug 12 of valve 11 is stationary in the position shown so that filtrate is free to pass through the lines 10 and 13 as indicated. This filtering action causes a film 9 of suspended solids and moisture to be deposited on the filter medium 6 of element 5. During this filtering action, the duration of which is limited by the speed at which the link chain 22 is traveling, and the length of this chain, valves 11 and 20 remain in the positions shown in Fig. 1, due to roller pins 25 and 26 of the chain 22 not being engaged in the Geneva stop gear or wheel 19.

Ultimately roller pin 25, which travels ahead of the second roller pin 26, passes over sprocket 23 with chain 22 and in passing over the upper sprocket 23 enters the notch of Geneva stop gear 19 and causes this gear to suddenly rotate clockwise through a 90 degree angle, when roller pin 25 leaves the notch as shown in Fig. 2. This sudden movement of 90 degrees of the Geneva gear 19 causes valve plug 12 of valve 11 and plug 21 of valve 20 to be shifted 90 degrees through the gear train 17, 16, and 18 to the positions shown in Fig. 2 with the result that filtrate pipe 10 is cut off from connection with suction source 13 and 14 and is connected with the compressed air source 28, so that a blast or puff of compressed air acts on the filtrate stored within chamber 8 of element 5, thus forcing filtrate back through the medium 6, which starts the dislodgement of the film 9 of intercepted solids. Simultaneous with this action, compressed air passes through line 29, and the open port in plug 21 of valve 20, which is now also shifted and this compressed air then suddenly flows through line 31 and out the perforations 33, under the filter element. The air escapes in bubbles 35, as shown in Fig. 2. These bubbles zigzag in the well known manner of an air-lift, upward past the exterior of the element, and first, cause ebullition and an upward current around the medium and film of cake still adhering thereto, and in addition reduce the density of the mixture of unfiltered material surrounding the element which reduces the hydrostatic resistance of the unfiltered mixture around element 5 so that the counter current from within the element acts more effectively in removing the film of intercepted solids. The upward exterior air-lift action also agitates the upward current of unfiltered mixture against the film and aids in tearing or floating the film from the medium.

Following closely behind roller pin 25 is roller pin 26 which is shown entering a notch in Geneva gear 19. As this pin is forced to revolve with chain 22 over sprocket 23, it again suddenly shifts the Geneva gear through an angle of 90 degrees and brings the valve plugs back to the positions shown in Fig. 1, where filtration is resumed and the air-lift action of bubbles from pipe 32 is stopped thus permitting the solids removed from element 5 to settle to the bottom 36 of the tank 1, on which they collect and from whence the thickened sludge can be removed as seen fit through spigot valve 34.

In Fig. 3 a modification is shown wherein the automatic valve shifting means is omitted and plugs 12' and 21' of valves 11' and 20' can be shifted in any manner conditions may call for. This arrangement is shown to illustrate a different way of applying the outside current.

Air is not admitted to the interior of the element in this arrangement, but a hydrostatic counter current of appropriate liquid or filtrate is supplied from gravity tank 8' above the valve 11' and connecting with same by means of line 18'. Filtrate is removed through line 13' by any convenient means, such as that shown in Fig. 1, or merely by a siphon action, or tank 1' may be closed and the contents of same subjected to pressure and filtrate forced by gravity or any pressure means through pipe 10' and line 13'. The method by which filtration is produced is immaterial, as this invention relates to the method of cake removal.

The element 5' is also shown having a bottom filtrate removal, as pipe 10' extends to near the bottom 38 of the element. Located directly below this is another bottom which, with its sides forms a chamber with perforations 33'. This chamber is disconnected from the element and merely serves as a chamber for distributing the air bubbles into the unfiltered mixture surrounding the element 5'. This chamber is connected with air cock 20' and its movable plug 21' by means of hose line or any convenient pipe line 32' and 31'. This illustrates another method of introducing air or gas bubbles either below the element and outside of same as seen in Fig. 3, or through the lower portion of same as shown in Fig. 4, apertures 33'' so that it bubbles through a portion of the medium and then up outside the balance of the element and medium.

In this diagram (Fig. 3) filtration is stopped and the hydrostatic counter current applied within the element by switching the plug 12' of valve 11' by hand or any desired means, thus disconnecting the element from filtrate outlet source 13′ and connecting the element interior with the low gravity head from tank 8′ through line 18′. Simultaneous therewith, or even following this counter current application, plug 21′ of valve 20′ is switched so that compressed air or gas flows from line 28′ through 31′ and 32′ and bubbles out through perforations 33′, thus causing the upward air-lift current around the element, and the cleansing action already described.

The application of the counter current from line 18′ and gravity source 8′ may be of but a fraction of a second in duration thus forcing very little filtrate or liquid back through the pores of the medium. All that is necessary is to let enough filtrate back to start the film of solids from the medium. Then the air-lift action from 32′ and 33′ as hereinbefore described will, if applied the proper length of time remove all the film from the medium.

As before stated, with some materials the upward current bubble action does not have to be applied simultaneously with the counter current application; it can follow it immediately, or overlap it or start previous to it, as long as filtrate is not being forced through the element by suction or pressure towards the inside of the element during this action. In other words filtration should be stopped and counter current applied at some stage during, or preceding, the bubbling action hereinbefore described.

With some materials, there will be no necessity for the tank 8′, and line 18′ and the orifice in valve 11′ connecting with line 18′ can open to the atmosphere, so that when plug 12′ is switched 90 degrees to connect line 10′ with the atmosphere, filtration will stop in element 10′, and then if the valve 20′ is properly switched to connect the compressed air source 28′ to lines 31′, 32′ and cause the bubbling current action up around the exterior of the element, this air-lift current will draw filtrate back through the medium and backward through line 10′, because it is now connected to the atmosphere, and this action together with the air-lift action already described will thoroughly remove the intercepted cake of solids from the outer surface of the medium. As soon as the bubbling action is stopped by closing valve 21′, the removed solids will fall to the bottom 36′ of tank 1′, then plug 12′ of valve 11′ can be again shifted to the filtration position.

If the gravity tank 8′ is necessary in some instances, where, for example, the film of solids on the elements is particularly slimy or rubbery and must be started from the medium by a more positive counter current pressure than described in the foregoing paragraph, this tank 8′ can be kept properly filled either with a portion of returned filtrate or any desired liquid such as water, through line 39.

It will be seen from the foregoing that any kind of a counter current such as liquid, air or otherwise can be used within the element, depending entirely on the nature of the solids and being more or less of minor importance, as long as it is used with the outside additional current action. Furthermore this outside current or cleansing action can be applied in any appropriate manner with or without the interior counter current action providing the filtration through the element is stopped when the outside cleansing action is applied.

Furthermore, although the bubbling action is shown as starting below the elements, it may be introduced higher up, as long as it causes a current in the unfiltered mixture surrounding the elements. It may even be forced through the lower portion of the element and bubble up outside of same somewhat similar to the construction shown in Fig. 4.

Investigations have definitely shown that this method of film removal in filter thickening of some difficult metallurgical products increases the filtration rate of filter thickeners from one tenth of a United States gallon through one square foot of filter medium in one minute to twice and three times this amount simply because the film of intercepted gummy solids is so efficiently removed at each sudden and brief counter current shock period (about one second) that little filtrate is lost back through the medium and the medium is left so clean through the action of the air-lift exterior to the film of solids that a material gain in filtration through the medium results.

In using a liquid counter current on this same material without the outside air-lift action on the film, a hydrostatic pressure of twenty to thirty pounds on the counter current filtrate is necessary for flooding some films from the medium. In addition to this the counter current or kick-back duration must be three or four seconds which necessarily consumes a large amount of filtrate, at the high hydrostatic pressure, for film removal only.

When the outside air-lift action is applied with the liquid counter current, the slightest counter current impulse is sufficient with most materials to start flooding the film from the medium. The bubble action outside the medium can be of longer duration and then thoroughly cleanses the fabric by completing the film removal.

The outside bubbling action can therefore be very effectively used with the wholly liquid counter current impulse, or with an impulse given to the filtrate itself within the element by suddenly admitting compressed air to the interior of the element or even letting some of the compressed air escape through the element surface itself to join its action with that of the exterior air-lift bubbling and cleansing current. In all cases the additional cleansing current applied from within the element will be of very short duration and shorter than that of the outside cleansing curernt.

Furthermore, I have found that it is not necessary that the outside bubbling cleansing current be applied substantially simultaneously with the application of the cleansing current that takes place through the medium. It can be slightly previous to the current from within on some materials, and even cease before the latter ceases, or it can follow the current through the medium and finish the cleansing action started by the former current. In some instances it can be applied all during the impulse from within and overlap the application of this current in any manner.

It has been demonstrated that with most materials the current through the medium starts the cleansing action at some point of least resistance in the film, and the outside air-lift current then rapidly tears, floods, floats or agitates the film from the balance of the medium, and whenever this cleansing action starts, the outside current will complete the cleansing action even without further aid from the current through the medium. In some instances again, all that is necessary is the cessation of filtration through the medium, by stopping the filtration suction or pressure through the medium, and then applying the outward cleansing action, which causes an air-lift current upward around the outside of the medium, and this current draws some filtrate back through the medium, and the film or cake of solids is entirely removed without the application of a positive counter current impulse from within the element. All of these applications depend on the nature of the material being filtered and dislodged from the medium. Those materials filtering easily and forming porous loose cakes or films will be cleansed from the medium with little or no impulse from within the element, as long as the filtration impulse through the medium is stopped during the outside current application. Materials that filter with more difficulty and form gummy or smeary films of so-called cake on the exterior of the elements, will need breaking or flooding away at some portion through the application of a filtrate or cleansing current from within or some other means before the outside current action of this patent will become fully effective.

I claim:

1. The method of filtering and thickening a mixture which comprises subjecting the mixture while in contact with a filtering medium to a filtering action in the course of which solids accumulate on the surface of the medium, periodically interrupting the filtering action and sending a cleansing current through the medium, and simultaneously therewith introducing a gas under pressure in proximity to the lower portion of the filter medium thereby producing an air-lift current of the mixture in the region of the filtering medium that enhances the discharging of said solids into the mixture to thicken the same.

2. The method of filtering and thickening a mixture which comprises subjecting the mixture while in contact with a filtering medium to a filtering action in the course of which solids accumulate on the surface of the medium, periodically interrupting the filtering action and initiating the removal of said solids by sending a cleansing current through the medium, and continuing such removal until the surface of the medium is sufficiently clean by introducing a gas under pressure in proximity to the lower portion of the filtering medium thereby producing an air-lift current of the mixture in the region of the filtering medium.

3. The method of enhancing the removal of accumulated solids from submerged filter elements which comprises introducing, while subjecting said elements to a cleansing current, a gas under pressure into the mixture being filtered in proximity to the lower portions of the filter elements thereby producing an upward current of the mixture over the surfaces of said elements.

4. The method of enhancing the removal of accumulated solids from submerged filter elements which comprises introducing, while the filtering operation is interrupted, a gas under pressure into the mixture being filtered in proximity to the lower portions of the filter elements thereby producing an upward current of the mixture over the surfaces of said elements.

5. The method of enhancing the removal of accumulated solids from filter elements submerged in the mixture to be filtered in which the filter elements are periodically subjected to filtering and cleansing operations in sequence which comprises periodically inducing, during the periods in which the filtering operations are interrupted by the cleansing operations and then only, a current of the mixture to flow over the surfaces of said submerged filter elements.

6. The method of removing accumulated solids from filter elements submerged in the mixture to be filtered in which the filter elements are periodically subjected to filtering and cleansing operations in sequence which comprises periodically initiating the removal of said solids by sending a cleansing current through the submerged filter elements and continuing such removal by agitating independently of said cleansing current the mixture in proximity to the surfaces of said submerged filter elements, said independent agitation being interrupted during the periodic filtering operations.

7. The method of enhancing the removal of accumulated solids from filter elements submerged in the mixture to be filtered in which the filter elements are periodically subjected to filtering and cleansing operations in sequence which comprises inducing a current of the mixture to flow over the surfaces of said submerged filter elements during said periodic cleansing operations, and interrupting said inducing action during said periodic filtering operations.

8. The method of enhancing the removal of accumulated solids from filter elements submerged in the mixture to be filtered in which the filter elements are periodically subjected to filtering and cleansing operations in sequence which comprises agitating the mixture in proximity to the surfaces of said submerged filter elements during and independently of said periodic cleansing operations, and interrupting said independent agitation during said periodic filtering operations.

9. The method of filtering and thickening a mixture which comprises subjecting the mixture while in contact with a filtering medium to a filtering action in the course of which solids accumulate on the surface of the medium, periodically interrupting the filtering action and sending a cleansing current through the medium, and simultaneously therewith producing an upward current of the mixture in close proximity to the filtering medium, resulting in the discharge of said solids into the mixture to thicken the same.

In testimony whereof I affix my signature.

GRAHAM CRUICKSHANK.